Patented May 7, 1946

2,399,875

UNITED STATES PATENT OFFICE 2,399,875

CIRCUIT FOR SINGLE-PHASE COMMUTATOR MACHINES

György Lorschy, Budapest, V., Hungary; vested in the Alien Property Custodian

Application November 26, 1941, Serial No. 420,572
In Hungary October 16, 1940

7 Claims. (Cl. 172—276)

This invention relates to single-phase machines of the commutator type and especially to circuit arrangements for supplying such machines from a source of three-phase current.

In order to transform without any special expedient a series wound single-phase motor of the commutator type into a motor with shunt characteristic certain circuit arrangements have been employed where the phase displaced voltages of the armature winding and the field winding of the motor are taken from a three-phase system. There is especially a method already known of connecting the armature winding with one and the field winding with another line voltage of a three-phase system. The drawbacks of this arrangement are that wrong connections may easily occur, that the motor receiving an exceedingly high no-load current, its efficiency is necessarily extremely low, and that all lines of the three-phase system are differently loaded.

There is also another method already known of connecting a single-phase motor of the commutator type with a source of three-phase current so that the requisite phase displacement of the said voltages is effected by means of a transformer on which the line voltage of the source of three-phase current is impressed, and to the middle of which one terminal of the field winding is joined. The drawback of this solution is the indispensable application of a special transformer, which as a necessary evil renders the machine especially in a smaller plant more expensive, more difficult to handle and which may easily be a source of mistakes.

Finally a similar arrangement has been proposed but with the application of two coupled single-phase motors joined to a three-phase system by a Scott transformer connection where the latter is performed by means of the windings of the motor themselves. The disadvantage of this arrangement is that always only motors of the same size and efficiency, which must be made also to harmonize with each other most accurately in many another respect, can be applied, in pairs, coupled with each other mechanically without being able to obtain a shunt characteristic. The invention seeks to remove the drawbacks above referred to.

The object of the invention is to effect the phase displacement of about 90 degrees required between the voltage of the field winding and that of the armature winding by means of windings with which the machine as a rule is in any case equipped to its own purposes.

A further object of the invention is to ensure for the machines without any special devices to be provided for this purpose a shunt characteristic and the most favourable electrical properties.

A still further object comprises a free scope for speed regulation within wide limits, also independently from the load carried by the machines at the moment and assuring the feature that the machines in question, whilst having a small difference between their speeds at no-load and under load, generally will impose an incomparably more uniform load on each of the various branches of the three-phase system, than has been obtainable with such arrangements as were employed for the intended purpose up to now.

The invention consists essentially in this, that either the field or armature and in certain cases the compensating winding of the machine has one terminal of one of these windings connected to the middle or about to the middle of another winding of them which is firmly fixed in the machine and, which in its turn, influences inductively the armature winding during the action and both terminals of the fixed winding are in a well known manner, directly or indirectly—for instance through a voltage regulator—connected to a separate phase line of the source of three-phase current concerned.

The circuit arrangement according to the invention effects the phase displacement required between the voltage of the field winding and that of the armature winding by means of a winding with which the machine as a rule is ordinarily equipped, automatically and independently of the load at any time.

As for the other terminal of the first winding it is desirable to connect it with the third phase line of the source of three-phase current concerned.

According to the invention, both terminals of the field winding and one terminal of the armature winding are in a well known way directly or indirectly—for instance through a voltage regulator—connected with each of the phase lines of the source of three-phase current, whereas the other terminal of the armature winding is connected to the middle or about to the middle of the field winding of the machine concerned.

A particularly suitable single-phase motor of the commutator type for such circuit arrangement according to the invention is characterized by a junction terminal leading practically immediately to the middle or about to the middle of one of the windings firmly fixed in the machine and influencing inductively its armature winding during the action.

Several such junction terminals may also be disposed, without any difficulty of construction, at or about the middle of this kind of winding in order to ensure a certain adaptability in the connection.

The said junctions may be of course adjustable.

The drawing represents diagrammatically a few examples of circuit arrangements embodying my invention. Like numerals in them designate corresponding parts throughout.

Fig. 1 is a diagrammatic representation of a two pole single-phase motor of the commutator type supplied from a three-phase system.

Figs. 2 and 3 represent similar arrangements, but employing a transformer in the circuit of the field winding and of the armature winding respectively.

Fig. 4 represents the arrangement according to Fig. 1, inserting also a compensating winding.

Fig. 5 represents the arrangement according to Fig. 4, but short-circuiting the compensating winding.

Fig. 6 corresponds also to the arrangement according to Fig. 4, but employing an adjustable connection between the armature winding and the compensating one.

Fig. 7 represents a similar arrangement to Fig. 4, but interchanging the connections of the field and the compensating winding with each other.

Fig. 8 represents the arrangement according to Fig. 7, but short-circuiting the armature winding.

Fig. 9 shows similar arrangement as Fig. 8, but completed with a transformer.

According to Fig. 1, the field winding 4 of a single-phase motor of the commutator type is connected between the phase lines 1, 2 of a three-phase system 1, 2, 3, and the armature winding 5 is connected between the third phase line 3 and the middle or about the middle of the field winding 4.

It is to be noted at this point that "winding" throughout means simple windings as well as multiple windings or winding systems.

Fig. 2 shows a similar circuit arrangement only with the addition, that the field winding 4 is connected between the phase lines 2, 3 and one terminal of the armature winding 5 is connected with the phase line 1, furthermore that the circuit of the field winding 4 possesses the auto-transformer 6 which can be regulated by itself.

Fig. 3 shows again the only addition, that the phase connections are further interchanged and that the auto-transformer 7 is employed in the circuit of the armature winding 5.

The drawing shows that both auto-transformers 6, 7 are provided with tappings. These transformers which can be inserted in both circuits at the same time may be freely chosen as to their kind of construction. They permit of influencing the working conditions within wide limits, for instance speed regulation without practically any loss as well as obtaining, if necessary, a low working voltage even from a high network voltage.

Compensating and/or auxiliary pole windings may continue to be employed in the usual manner.

Fig. 4 shows how the circuit arrangement according to Fig. 1 is—in a well known manner—completed by a compensating winding 8.

Fig. 5 represents the arrangement according to Fig. 4, where the line 9 short-circuits the compensating winding 8.

Fig. 6 represents how the motor of the arrangement according to Fig. 4 can obtain a synchronous speed or one different from that according to the distance by which the adjustable contact of the lead 10 along the compensating winding 8 is moved more or less to the right, i. e. to the approximity of the armature winding 5.

Fig. 7 shows again the arrangement according to Fig. 4, where the connection of the field winding 4 and that of the compensating winding 8 are interchanged. One terminal of the latter is connected with the phase line 1 and one terminal of the field winding 4 joins to the middle or about to the middle of the compensating winding 8.

The requisite phase displacement between the voltages impressed on the two kinds of windings is again present.

The other usual modes of connection of the compensating winding 8 continue also to be admitted. It suffices even to have between the two kinds of windings 5, 8 an inductive connection instead of a conducting one.

Fig. 8 shows similar arrangement as Fig. 7, but connecting one terminal of the field winding 4 with the phase line 1.

The lead 11 short-circuits the armature winding 5 so that the compensating winding 8 figures really as a working winding.

Fig. 9 represents a similar arrangement as Fig. 8. The armature winding 5 connected only inductively with the windings 4, 8 may obtain for the purpose of speed regulation different voltages from a transformer 12, the high voltage winding 13 of which is connected with the phase lines 2, 3, i. e. those on which the compensating winding is laid, the contact of the lead 15 being adjustable along the low voltage winding 14 of the transformer 12.

What I claim is:

1. In a circuit arrangement for supplying single-phase commutator machines from a three-phase source of energy, a machine having a stator winding provided with terminals adapted to be energized from two of the phases of the source, a second winding provided with a pair of energizing connections, one of said connections adapted to be connected to the third phase of the source and the other of said connections being operatively connected to a point intermediate the ends of said stator winding, and a rotor upon which said second winding is carried operatively related to said stator winding whereby it is caused to rotate when said windings are energized.

2. In the circuit arrangement as claimed in claim 1, voltage regulating means being connected between said stator winding and said terminals.

3. In the circuit arrangement as claimed in claim 1, voltage regulating means connected to one of said windings.

4. In the circuit arrangement as claimed in claim 1, voltage regulating means connected between one of said windings and its source of energy.

5. In a circuit arrangement for supplying single-phase commutator machines from a three-phase source of energy, a machine having a stator, a winding on said stator provided with terminals adapted to be energized from two of the phases of the source, a rotor in said machine, a winding on said rotor, a commutator on said rotor, a pair of brushes carried by said stator in contact with said commutator, a connection adapted to connect one of said brushes to the third phase of the source, and a connection operatively connected from the other of said brushes to a point intermediate the ends of said stator winding.

6. In the circuit arrangement as claimed in claim 5, said point intermediate the ends of said stator winding being substantially in the center thereof.

7. In the circuit arrangement as claimed in claim 5, a compensating winding in series in said connection operatively connected from the other of said brushes to a point intermediate the ends of said stator winding.

GYÖRGY LORSCHY.